Jan. 24, 1956    J. BLAEKER    2,732,501
ULTRAVIOLET AIR DISINFECTING APPLIANCE
Filed Nov. 30, 1950    2 Sheets-Sheet 1
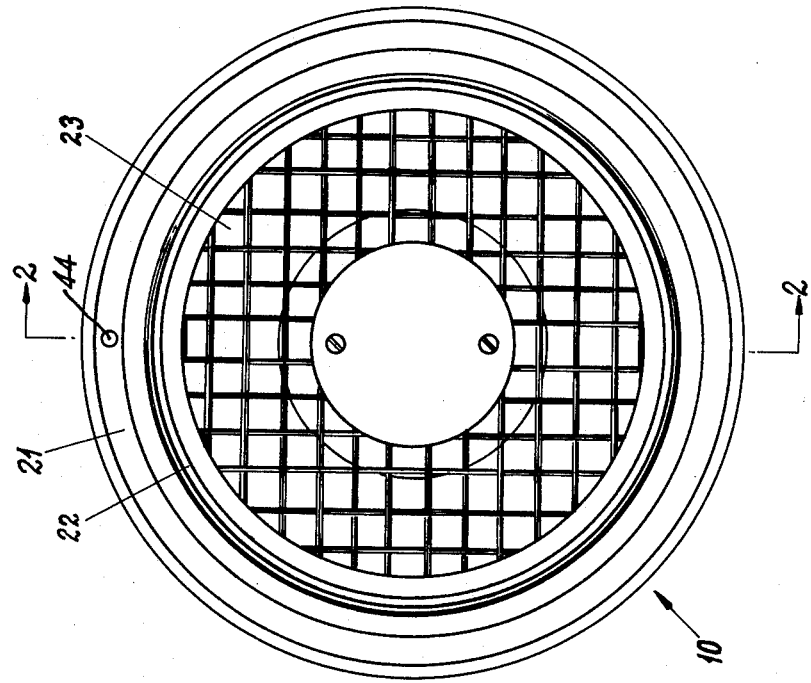
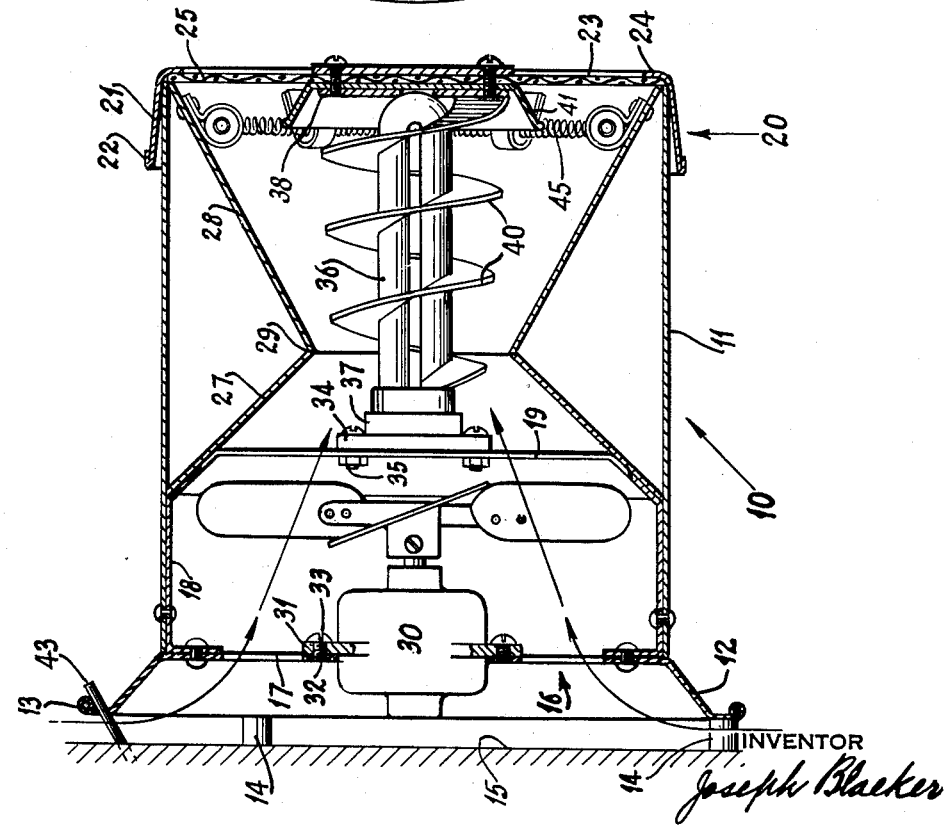
INVENTOR
Joseph Blaeker Jan. 24, 1956   J. BLAEKER   2,732,501
ULTRAVIOLET AIR DISINFECTING APPLIANCE
Filed Nov. 30, 1950   2 Sheets-Sheet 2

Joseph Blaeker
INVENTOR

United States Patent Office 2,732,501
Patented Jan. 24, 1956

2,732,501
ULTRAVIOLET AIR DISINFECTING APPLIANCE
Joseph Blaeker, Brooklyn, N. Y.

Application November 30, 1950, Serial No. 198,323

9 Claims. (Cl. 250—43)

This invention relates to an air disinfecting electric appliance having an ultraviolet ray emitting germicidal electric lamp and wherein a Venturi shaped casing serves to direct incoming air into contacting relation with the electric lamp, and whereby the rays emitted by the electric lamp are reflected outwardly of the appliance in the form of a diverging conical beam.

An object of this invention is to provide a tubular casing having an inner Venturi shaped casing comprising a converging conically shaped member and an integral diverging conically shaped reflecting member forming a throat, and to mount an ultraviolet ray emitting electric lamp within the diverging conically shaped member and axially thereof, the mounting for the electric lamp being arranged to permit one end portion of the electric lamp to be positioned at the throat and without support from the reflector, thereby providing a complete annular air passage space to the electric lamp, and whereby incoming air is directed to contact one end of the electric lamp and to continue along the length of the electric lamp and to be discharged from the appliance through the diverging conically shaped deflecting member.

Another object of this invention is to provide means for shielding the electric element to prevent its visibility to an observer, while permitting passage of light from the lamp to the reflector.

Another object of this invention is to provide an air disinfecting or germiciding electric appliance which is portable and may be carried from room to room and may be hung on a nail ready for service, and which may be operated with or without an electric fan and with or without a heating element mounted therein, and which will disinfect or germicide the air during the period of passage of the air through the appliance.

With the above and other objects in view, the invention will be hereinafter more particular described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view of the appliance.

Figure 2 is a cross-sectional view taken on line 2—2 in Figure 1.

Figure 3:
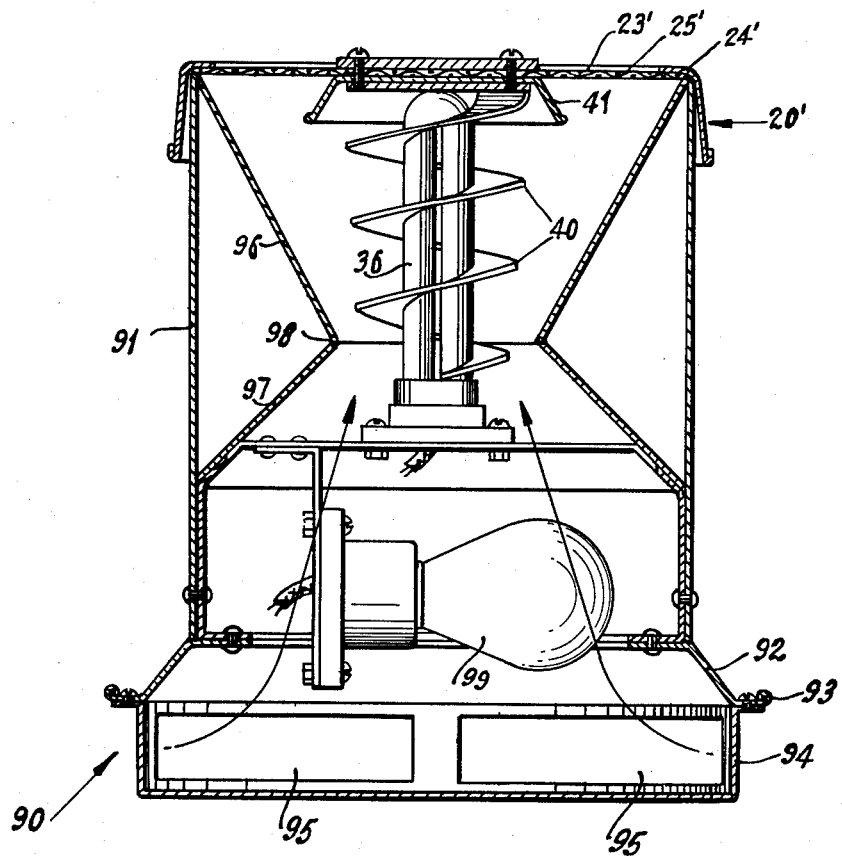
Figure 3 is a central cross-sectional view of a modified germicidal appliance.

In the illustrated embodiment of the invention, the numeral 10 indicates an air treating electric appliance comprising a cylindrical outer casing 11, one end of which is closed by a dish-shaped member 12 having a flange 13. The member 12 preferably has legs 14 by which the appliance may be mounted on a wall 15 in spaced-apart relation therefrom to permit air to enter the casing 11, as indicated by the arrows. The air enters into the interior of the casing 11 through an opening 16 in the face portion 17 of the closure member 12. The closure member 12 is suitably secured to the casing 11 by a bracket 18 having a narrow shelve 19.

The outlet end of the casing 11 is closed by a dish-shaped closure member 20 having a tubular body 21 which terminates in a rib 22. The air leaves the casing 11 through an opening 23 in the face portion 24 of the closure member 20. The opening 23 is shown covered by a grid plate 25.

Mounted inside the casing 11 is a modified Venturi effect flow accelerating means comprising a converging conical member 27 and a diverging conical member 28 which are suitably connected together to form a constricted throat 29. The diverging conical member is made of highly reflecting material and functions as a conical reflector.

An electric fan 30 having a mounting frame 31 with threaded apertures 32, is mounted in the inlet end portion of the casing and secured to the face or flange 17 by screws 33 threaded in the apertures 32.

A radio-type tube socket or mounting 34 is secured to the shelve 19 of the bracket 18 and centrally of the casing 11 by screws 35. An elongated U-shaped ultraviolet ray emitting lamp 36 having a radio-type base 37 is secured on the mounting 34. The free end of the lamp 36 extends to the vicinity of the opening 23. An annular disk 38 defines one end of a helical shield 40.

The shield 40 is mounted on the lamp 36 and is coextensive with the length of the lamp. The helical shield has annular spring-like or interconnected laterally extending apertured elements spaced-apart from each other and each of suitable outer diameter to prevent direct visibility of the lamp 36 to an observer at the outlet end of the appliance. To shield the front end portion of the lamp 36 I provide a solid end member 41 which is preferably dish-shaped. The member 41 is fastened centrally of the closure member 20.

As shown in Figures 2 and 3, it will be seen that the helical shield 40 comprises annular spring-like or interconnected laterally extending apertured elements of considerable radial or lateral extent but of a size smaller in outer diameter than the conical outlet member 28.

It is to be noted that the helical shield 40 not only serves to shield and prevent direct visibility of the lamp 36 to an observer at the outlet end of the appliance, but causes the air discharged by the fan 30 to circle around the lamp a number of times and this increases the time duration that the air is in contact with the lamp and augments the disinfecting treatment of the air. While a beam of light is projected across the room, adapted to do the disinfecting of the air, the air discharged from the appliance 10 is sufficiently disinfected or germicided due to the action of the lamp 36 augmented by the shield 40.

As shown in Figure 2, a nail or the like 43 is driven in the wall 15 at an upper elevation, preferably near the ceiling. The nail passes through an aperture 44 in the flange 13 of the dish shaped member 12 and this serves to support the appliance 10 in a horizontal plane at an elevation above a floor.

It is also to be noted that suitable electric wiring is provided and includes a transformer and starter (not shown) for the lamp 36. Also suitable electric switch devices whereby the fan 30 and a heating element 45 may be energized to provide cool air or heated air as desired.

In practice, the shield 40 is made so that the individual spring-like or interconnected laterally extending apertured shield elements prevent direct rays from the lamp 36 to pass out of the opening 23. Reflected rays only, from the conical reflector 28, are permitted to pass out of the germicidal appliance 10 through the opening 23.

It will thus be noted that in the preferred embodiment, the converging hollow frusto-conical air inflow guide 27 is coaxially positioned with the axis of the lamp 36 and directs the air from the fan 30 endwise and along the lengthwise extent of the lamp. The lighted diverging reflector and outflow guide 28 is formed of a hollow frustum of a cone, which forms a spreading beam of light which when received on a flat surface generates a lighted spring-like or interconnected laterally extending apertured area of substantially uniform intensity all over the area.

It will also be noted that the appliance 10 is designed to produce a double action effect in the disinfection both of the fan driven air passing through the appliance and on the air in the room not passing through the appliance. The first by direct rays, and the second by reflected rays.

As the germicidal appliance 10 continues in operation, there is a stepped up circulation of air throughout the room and all the air in the room is quickly passed through the zone receiving the direct germ-killing rays from the lamp and thus all the air in the room is purified. Because of the helical plural element disk shield 40 which extends coaxially with the lamp, the shield guards a person from any direct rays from the lamp.

The helical shield 40 functions as an air guide which directs the incoming air to repeatedly circle around the lamp. The shield causes step-by-step contact with the lamp and its germicidal rays along the length of the lamp. The spring-like or interconnected laterally extending apertured solid elements of the helical shield 40 are spaced-apart from each other in designed relation so that they mask the lamp against direct visibility by an observer.

As shown in Figure 2, it will be seen that the outer periphery of each of the spring-like or interconnected laterally extending apertured elements making up the shield 40 are of considerably smaller outer diameter than the inner diameter of the diverging conical inner casing member 28. It will also be seen that the shield elements increase in diameter from the throat 29 of the inner casing to the outlet 23 of the appliance 10.

As shown in Figure 3, I have provided a modified germicidal appliance 90 comprising a tubular outer casing 91, one end of which terminates in an inverted dish shaped member 92 having a flange 93. The member 92 is suitably secured to a pan shaped end member 94 having air inlets 95 and designed to rest on a suitable base with the appliance in an upright position.

The outlet end of the casing 91 is closed by an inverted dish shaped member 20' of the same construction as the closure member 20, best shown in Figure 2. The air leaves the casing 91 through an opening 23' in the face portion 24' of the closure member 20'. The opening 23' is covered by a wire grid 25'.

The appliance 90 includes a frusto conical reflector 96 and a frusto conical air inlet member 97 and a throat 98. I have also mounted an incandescent electric lamp 99 inside the casing 91. The electric lamp is placed near the air inlets 95 so that when the electric lamp is lighted, the heat generated thereby will cause the air to be expanded and to pass outwardly through the outlet 23' and thereby cause air circulation through the appliance 90 and around a germicidal lamp 36 having a shield 40 therearound.

The helical shield 40 comprises spring-like or interconnected laterally extending apertured members which are spaced apart from each other in designed relation so that they mask the lamp 36 against direct visibility by an observer. Light from the lamp 36 impinges on the reflector 96 and this causes reflected rays to be projected from the appliance 90.

It will thus be noted that while the appliance 10 contains a motor and a fan and a heating element, that the appliance 90 is without these features and functions as an air circulator by expansion of air due to heat rays from the incandescent lamp 99 when energized while the germicidal lamp 36 is in operation.

In actual operation, the dished member 41, or a disk of large size to cover the central portion of the front face of the appliance is used to augment the shielding effect of the spaced-apart annular disks of the shield 40. The central portion of the lamp 36 is masked by the end member 41.

It is to be noted that in place of the incandescent lamp 99 I may employ an electric heating element (not shown).

The heat from the incandescent lamp 99 or from the heating element will cause air circulation through the appliance. In another modification, I may place a small fan (not shown) in place of the lamp 99 to cause air circulation through the appliance. These various devices function as air flow means the purpose of which is to cause induced air circulation through the appliance while in contact with the germicidal lamp 36.

The germicidal lamps 36 are of the fluorescent type designed to project ultraviolet rays. These lamps generate very little heat and are only slightly warm.

In accordance with the patent statutes I have described and illustrated the preferred embodiment of my invention, but it will be understood that various changes and modifications can be made therein without departing from the spirit of the invention as defined by the appended claims.

I claim:

1. An air disinfecting electric appliance comprising a tubular casing having an air inlet at one end and an air outlet at the opposite end, a centrally supported electric mounting, a ray producing electric element, a Venturi effect inner casing comprising an inwardly converging conical member and an outwardly diverging conical member and a throat, said ray producing electric element being secured to said mounting, thereby providing an annular air passage space at said throat, said converging conical member having walls directed to cause incoming air to impinge against an end portion of said electric element, an air circulating means within said casing causing movement of air axially of said casing and discharge through said diverging conical member, said outwardly diverging conical member being made of reflecting material forming a conical reflector, a helical light shielding member mounted on said electric element, said helical member comprising annular spring-like elements and a solid disk-like end member, said shielding member serving to prevent visibility of said rays to an observer while permitting reflected rays to pass out of said appliance in beam form, the central portion of said lamp being masked by said end member whereby only an annular beam of reflected rays is projected in diffused form.

2. An air disinfecting electric appliance comprising a tubular casing having air inlet means at one end and air outlet means at the opposite end, an electric mounting, a ray producing electric element secured on said mounting, a flow accelerating means comprising an outwardly diverging conical member having a throat, said electric element being secured to said mounting, thereby providing an annular air passage space to said electric element, said throat causing incoming air to impinge directly against an end portion of said electric element, an air circulating means within said casing causing movement of air axially of said casing and to move out of said diverging conical member, said diverging conical member being of highly reflecting material forming a reflector having its largest diameter directed outwardly, a helical light shielding member mounted on said electric element, said helical member comprising annular spring-like elements and a solid end member, said shielding member serving to prevent visibility of said rays to an observer while permitting reflected rays to pass out of said appliance, the central portion of said lamp being masked by said end member whereby a beam of reflected rays is projected from said appliance in annular form.

3. In an air disinfecting electric appliance, comprising a uni-directional casing having air inlet means at one end and an outwardly diverging conical air outlet and light beam reflector at the opposite end, an electric mounting, an ultraviolet ray germicidal electric lamp secured to said mounting and extending lengthwise of said appliance, a converging conical member having a restricting throat, said electric lamp being secured to said mounting in a manner as to provide an annular air passage space to said electric lamp, to cause incoming air to impinge against said germicidal electric lamp, a helical shield mounted to circumscribe said germicidal electric lamp, to mask said lamp and prevent its visibility to an observer, an electrically heated air circulating means positioned in said appliance causing air circulation through said appliance along said germicidal electric lamp and out of said appliance, said helical shield comprising interconnected laterally extending apertured elements respectively of a size smaller in outer diameter than the inner diameter of said diverging conical reflector, permitting air passage therebetween for disinfecting the air passing through said appliance, a helical shield mounted on said electric lamp, to mask said lamp and prevent its visibility to an observer, an electric air circulating means positioned at the inlet of said appliance causing air circulation through said air inlet means along said electric lamp and out of said appliance, said helical shield comprising interconnected laterally extending apertured elements respectively of a size smaller in outer diameter than the inner diameter of said diverging conical reflector, permitting air passage therebetween.

4. The invention as defined in claim 1, wherein an incandescent element is mounted in said casing to heat the air at the inlet end of said appliance and cause air circulation in said appliance.

5. A double action air disinfecting appliance, comprising a tubular casing having an inlet at one end and an outlet at the other end, said casing having a venturi-type inner casing including a conical reflecting surface at said outlet end, an ultra-violet lamp positioned axially of said casing, an air circulating means within said casing causing movement of air against said ultra-violet lamp to be disinfected inside said appliance, a helical light shielding member mounted on said lamp, said helical shielding member comprising an annular spring-like element of considerable radial extent but of a size smaller in outer diameter than said conical outlet and terminating in a solid end member, said shielding member increasing in diameter toward the outlet of said venturi-type casing, said shielding member being arranged to prevent exposure of direct rays of light from said ultra-violet lamp to an observer, said conical reflecting outlet causing rays reflected from said ultra-violet lamp to pass outwardly of said appliance and disinfect the air outside said appliance by reflected rays in annular beam form.

6. A double action air disinfecting appliance, comprising a tubular casing having an inlet at one end and an outlet at the other end, said casing having a venturi-type inner casing including a conical reflecting surface at said outlet end, an ultra-violet lamp positioned axially of said casing, an air circulating means within said casing causing movement of air against said ultra-violet lamp to be disinfected inside said appliance, a helical light shielding member mounted lengthwise of and in substantially circumscribing relation with said lamp, said helical shielding member comprising an annular spring-like element of considerable radial extent but of a size smaller in outer diameter than said conical outlet and terminating in a solid end member, said shielding member being arranged to prevent exposure of direct rays of light from said ultra-violet lamp to an observer, said conical reflecting outlet causing rays reflected from said ultra-violet lamp to pass outwardly of said appliance and disinfect the air outside said appliance by reflected rays.

7. In an air disinfecting electric appliance comprising a tubular casing having an inlet at one end and an outlet at the opposite end, said appliance having an ultra-violet ray germicidal electric lamp mounted coaxially thereof, a diverging conical tubular reflector mounted in circumscribing relation with said lamp, a helical shield to mask said lamp and prevent direct visibility of said germicidal lamp to an observer while permitting reflection of said ultra-violet rays, said helical shield comprising interconnected laterally extending apertured elements respectively of a size smaller in outer diameter than the inner diameter of said diverging conical reflector, permitting air passage therebetween, said elements being in spaced-apart relation from each other and said shield terminating in a solid end member for shielding the end portion of said lamp, said lamp being U-shaped and having a radio-type base at one end, a centrally supported electric mounting, said lamp being secured to said mounting, an electrically heated air circulating means positioned in said appliance causing induced air circulation through said appliance.

8. In a germ killing and air disinfecting appliance comprising a tubular outer casing, a germicidal electric lamp, a venturi-type inner casing comprising a diverging conical reflector, axially of said casing, said casing being uni-directional, having an inlet at one end and an outlet at the opposite end, said appliance having a helically shaped shield mounted in circumscribing relation with said lamp, said shield comprising interconnected laterally extending apertured elements respectively of a size smaller in outer diameter than the inner diameter of said diverging conical reflector, permitting air passage therebetween, said elements being in spaced-apart relation from each other and said shield terminating in a solid end member for shielding the end portion of said lamp, said lamp being U-shaped and having a radio-type base at one end, a centrally supported electric mounting, said lamp being secured to said mounting and an electrically heated air circulating means positioned in said appliance causing air circulation along said electric lamp and out of said appliance, said elements being inclined to the axis of said lamp.

9. In a double action ultraviolet air disinfecting electric appliance designed to project a beam of reflected ultra-violet radiation, a tubular casing having a linear passageway, a Venturi type inner casing comprising a diverging conical reflector mounted at one end of said passageway and with the diverging portion at the outlet end of said passageway, a ray producing linear ultraviolet lamp mounted coaxially with and inside said conical reflector, an incandescent electric heating means, independent of said ultraviolet lamp and mounted at the inlet of said passageway, said ultraviolet lamp being positioned in superposed relation and in substantial alignment with said incandescent electric heating means, said heating means serving to cause passage of heated air in a linear direction around said ultraviolet lamp, said air circulating means causing heated air to impinge directly against an end portion of said ultraviolet lamp to be disinfected by said lamp inside said appliance, said conical reflecting outlet causing reflected rays from said ultraviolet lamp to pass outwardly of said appliance and disinfect the air outside said appliance by reflected rays projected in beam form by said conical reflector.

References Cited in the file of this patent

UNITED STATES PATENTS

| | | |
|---|---|---|
| 1,051,350 | Nogier | Jan. 21, 1913 |
| 1,196,481 | Recklinghausen et al. | Aug. 29, 1916 |
| 1,215,222 | Van Calcar et al. | Feb. 6, 1917 |
| 1,723,603 | Chesney | Aug. 6, 1929 |
| 2,024,207 | Creighton et al. | Dec. 17, 1935 |
| 2,175,682 | Chaffee | Oct. 10, 1939 |
| 2,183,387 | Anderson | Dec. 12, 1939 |
| 2,183,498 | Anderson | Dec. 12, 1939 |
| 2,248,618 | Fischer | July 8, 1941 |
| 2,297,933 | Yonkers | Oct. 6, 1942 |
| 2,309,546 | Shapiro | Jan. 26, 1943 |
| 2,354,817 | Law | Aug. 1, 1944 |
| 2,389,698 | Stowell | Nov. 27, 1945 |
| 2,413,494 | Fortney | Dec. 31, 1946 |
| 2,413,704 | Glatthar et al. | Jan. 7, 1947 |
| 2,485,410 | Pope | Oct. 18, 1949 |
| 2,553,690 | Raider | Dec. 12, 1950 |